United States Patent [19]

Kobayashi et al.

[11] 3,792,356

[45] Feb. 12, 1974

[54] RECEIVER STRUCTURE FOR EQUALIZATION OF PARTIAL-RESPONSE CODED DATA

[75] Inventors: Hisashi Kobayashi, Ossining; Donald Tao-Nan Tang, Yorktown Heights, both of N.Y.

[73] Assignee: International Business Machines Corporation, Armonk, N.Y.

[22] Filed: Dec. 27, 1971

[21] Appl. No.: 212,578

[52] U.S. Cl. ...................... 325/42, 178/88, 325/323, 333/18, 333/70 T

[51] Int. Cl. ............................................ H04b 3/14

[58] Field of Search ...... 178/70 R, 88; 325/42, 323; 333/18, 70 T; 179/170.2

[56] References Cited

UNITED STATES PATENTS

| | | | |
|---|---|---|---|
| 3,524,169 | 8/1970 | McAuliffe et al. | 333/18 X |
| 3,696,203 | 10/1972 | Leonard | 325/323 X |

*Primary Examiner*—Malcolm A. Morrison
*Assistant Examiner*—R. Stephen Dildine, Jr.
*Attorney, Agent, or Firm*—Roy R. Schlemmer

[57] ABSTRACT

The present invention relates to a new receiver structure for the equalization of partial-response or correlative level coding systems in which the main equalizer and quantizer are embedded inside the inverse filter. The main embedded filter primarily accomplishes equalization of signal distortion in the tail portion of the received signal. According to a further aspect of the invention, a separate precursor equalizer may be utilized in front of the receiver structure in situations where the front end or precursor intersymbol interference is not negligible. According to one additional aspect of the invention where the number of precursor interference terms is small, a certain amount of precursor equalization may be included in the inverse filter portion of the main receiver structure. The receiver structure has a wide variety of applications and will function well with a number of different correlative coding schemes. Further, the main equalizer embedded within the receiver structure may be of the fixed, automatic or adaptive type as are well known in the art. The source of the correlatively encoded data containing undesired intersymbol interference due to characteristics of the channel or noise may be either a transmission line or, for example, a magnetic recording and pickup system utilizing the NRZI recording scheme.

10 Claims, 13 Drawing Figures

RECEIVER STRUCTURE FOR EQUALIZATION OF PARTIAL-RESPONSE CODED DATA

BACKGROUND OF THE INVENTION

Generally in the field of digital data communication the prime requisites of any successful communication system are to increase the rate at which data may be transmitted. This is obviously because most transmission channel costs are dependent upon time of use, regardless of the amount of data which can be transmitted. Obviously, to obtain maximum return upon the investment in transmission channel time, the one feature which must be maximized is the data rate.

It is generally well known that the maximum rate at which digital data can be successfully transmitted through a limited bandpass channel depends upon the effects of intersymbol interference within the channel. As signals representing digits are transmitted through the channel, each pulse generates certain time-distributed signal components which, unless rendered ineffective or compensated for, may interfere with the transmission of one or more succeeding pulses if the pulses are spaced more closely than a critical amount. This interference is generally due to characteristics of the channel itself and is further complicated by noise which is generally introduced into the channel through certain more or less uncontrollable external sources.

A technique well known in the art for reducing permissible time spacing or increasing the packing between successive digit signals involves "correlative level coding", also known as "partial-response coding" or "digital modulation". In such systems, each signal is combined with some function of a signal transmitted earlier in that sequence. By using this encoding method and tolerating a controlled amount of interference, one can obtain a substantial increase in the transmission rate.

Although correlative level coding increases the transmission rate, it does have some attendant disadvantages. First, it causes an increase in the number of signal levels from $m$ levels at the source to a larger number of levels M, at the receiving end of the channel. Thus, the type of encoding described previously causes the number of possible signal levels to increase from $m$ to $M = 2m-1$. If, for example, the original sequence has only two signal levels; i.e., 1 and 0, then a modulating operation may produce signals at any one of three levels, +1, 0 and −1, respectively. Similarly, an original three-level sequence may have as many as five signal levels after encoding. The increase in the number of available signal levels due to correlative encoding is not regarded as a serious disadvantage when compared with the advantage of increased digital transmission rate.

Another disadvantage of correlative level encoding is that it may cause the propagation of transmission errors. Thus, if a particular digit is incorrectly transmitted, this single error may be propagated as a chain of errors in the decoded sequence at the receiving end of the system. However, this may be overcome by known precoding techniques. However, precoding will not eliminate individual unpropagated transmission errors due to intersymbol interference caused primarily by the channel. At this point it should be noted that the channel, as used herein, is intended to include the carrier signal generator, modulator, the transmission medium, demodulator, lowpass or matched filters and samplers together with any noise sequences which may be introduced. Similarly, channel as used herein, also refers, for example, to a magnetic recording system wherein as stated previously, the source of the signal picked up by the present receiver could be the pickup head in conjunction with some magnetic recording medium which would introduce intersymbol interference problems similar to those of a transmission channel.

For purposes of the ensuing description of the invention, a partial-response coding may be characterized by a discrete transfer function P(D):

$$P(D) = p_0 + p_1D + p_2D^2 + \ldots + p_nD^N \qquad (1)$$

where D is the delay operator (equivalent to $Z^{-1}$ where Z is the well known Z-transform variable), and represents one unit delay, $p_0$ corresponds to the signal value and $p_1, \ldots, p_N$ represents the controlled intersymbol interference terms. For example, $P(D) = 1+D$ in the so-called duobinary signaling, and $P(D) = 1-D^2$ (occasionally called partial-response Class IV) is often adopted in high-speed data modems with single sideband as vestigial sideband modulation. $P(D) = 1-D$ is a good approximation of a digital magnetic recording system. If the information sequence is $\{a_n\}$, then the output of the partial-response system without precoding is, in the absence of noise and undesired intersymbol interference, given by $\{c_n\}$:

$$c_n = \sum_{k=0}^{N} a_{n-k}p_k \qquad (2a)$$

or equivalently in terms of D-polynomials $$C(D) = A(D)\,P(D) \text{ (No Precoding)} \qquad (2b)$$

where $$A(D) = \sum_{k=0}^{\infty} a_kD^k, \text{ etc.} \qquad (3)$$

Partial-response coding is often realized in the frequency domain by appropriate channel shaping. However, they may be represented by the discrete transfer function of Equation (1) insofar as sample values are concerned. It is also assumed, for the general case, that $m$-different levels which $\{a_n\}$ takes on are integers $(0, 1, \ldots, m-1)$. In most cases the data information sequence is not passed directly into the partial-response encoder as indicated by Equation (2b). As stated previously, the sequence $\{a_n\}$ undergoes a precoding operation which changes it into the sequence $\{b_n\}$ to avoid possible error propagations in the detected sequences at a receiving station. Then the sequences $\{a_n\}$, $\{b_n\}$ and $\{c_n\}$ are related by:

$$B(D) = [A(D)/P(D)] \bmod m \qquad (4a)$$

and $$C(D) = P(D)\,B(D) \qquad (5a)$$

or equivalently, by:

$$b_n = \frac{1}{p_0}\left\{a_n \sum_{k=1}^{N} b_{n-k}p_k\right\} \bmod m \qquad (4b)$$

and $$c_n = \sum_{k=0}^{N} b_{n-k}p_k \qquad (5b)$$

Referring to FIG. 1, a partial-response coding system including a precoder is shown wherein the various elements of the transmitting and receiving stations are clearly labeled. It will, of course, be understood that the receiving station including the equalizer, quantizer and the decoder, in essence, reverses the precoding and partial-response coding operations. It should also be understood that the receiver may be essentially broken down into two elements; the first being an inverse filter which has a transfer function 1/[P(D)] which in effect reverses the partial-response coding operation to produce a sequence $\{\hat{b}_n\}$ an estimate of $\{b_n\}$. The second portion of the receiver is the decoder or digital demodulator which has a transfer function $[P(D)]_{mod\ m}$ which produces $\{\hat{a}_n\}$, an estimate of the original sequence $\{a_n\}$.

With such a partial-response coding system, the information sequence which is sent to the receiver is the sequence $\{c_n\}$ of Equation (5*b*) corrupted by random noise and the undesired intersymbol interference which arises due to imperfections of the channel regardless of whether the channel is a transmission system or a magnetic recording system. This is equivalent to saying that the channel contains undesired memory properties which are not exactly known to the receiver and which, in fact, quite often change with time. These undesired intersymbol interference terms are the major obstacles in high speed data transmission systems and in high density magnetic recording systems. The objective of equalizers as shown in FIG. 1 and known in the prior art in general, is to reduce these intersymbol interference terms.

The primary difficulty which arises in the receiver configuration outlined in FIG. 1, is that there is as yet no algorithm for automatic or adaptive equalization which is guaranteed to converge or remove absolutely the possibility of data transmission errors due to such intersymbol interference. The essential difficulty associated with existing equalization methods as applied to partial-response systems lies in the fact that the output of partial-response system is a correlated sequence. When one tries to deconvolve a correlated sequence, using the inverse filter 1/[P(D)], to obtain an uncorrelated sequence, one ends up with a very heavily distorted linear channel which makes equalization extremely difficult.

SUMMARY AND OBJECTS OF THE INVENTION

It has been found that improved equalization, especially in terms of minimization of the circuitry necessary to obtain reasonable convergence in the receiver, may be obtained utilizing the present invention wherein the equalizer circuitry is embedded within the inverse filter. By doing this, there is greater assurance of the applicability or reliability that the automatic or adaptive equalization circuit will produce the desired degree of convergence. Further, the present receiver structure is particularly suited for use with error detection schemes such as disclosed in U. S. Pat. No. 3,622,986, issued Nov. 23, 1971 by the same inventors entitled "Error Detecting Technique for Multi-Level Precoded Transmission". Finally, with the present receiver structure an improved signal-to-noise ratio in certain partial-response systems is obtainable.

It is accordingly a primary object of the present invention to provide a novel receiver structure for the equalization of partial-response coded data received from a channel.

It is yet another object of the invention to provide such a receiver structure where an equalization circuit is embedded within the inverse filter and quantizer portion of the receiver.

It is a still further object to provide such a receiver structure wherein the embedded equalizer may be of the fixed automatic or adaptive type.

It is another object to provide such a receiver structure wherein precursor intersymbol interference terms may be removed by adding a precursor equalizer prior to the inverse filter.

It is another object of the invention to provide such a receiver structure wherein a limited number of precursor terms may be eualized by modifying the inverse filter structure.

It is another object of the invention to provide such a receiver structure with general applicability to a wide variety of partial-response transfer characteristics.

The foregoing and other objects, features and advantages of the invention will be apparent from the following more particular description of preferred embodiments of the invention, as illustrated in the accompanying drawings.

DESCRIPTION OF THE DISCLOSED EMBODIMENTS

The objects of the present invention are accomplished in general by a receiver system for receiving and decoding partial-response coded data sequences from a channel. The receiver includes an inverse filter and a decoder for performing the inverse of the partial-response coding and the precoding operations, respectively, to produce the original data sequence and further includes an equalizer filter embedded within the inverse filter portion of the receiver. This generalized structure provides equalization primarily of the tail intersymbol interference terms of the received signal. In order to achieve equalization of precursor intersymbol interference terms a suitable separate equalizer may be provided in the receiver system at a point prior to the inverse filter feedback point. Alternatively, a limited amount of equalization of such precursor intersymbol interference terms may be obtained by slightly modifying the delay circuitry within the inverse filter and decoder circuits.

More particularly, the receiver structure of the present invention comprises an inverse filter for performing the inverse of the partial-response transfer function, a decoder for performing the inverse of the precoding transfer function, a multi-tap equalizer filter, a first adder for receiving a data sequence from the channel as one input and the output of the inverse filter feedback path as the other input, means connecting the output of said first adder to said equalizer filter, means connecting the output of said equalizer filter to the input of the inverse filter and second detector control circuitry and one input to a modulo *m* adder, wherein m is the number of levels in the partial-response coding scheme utilized, and wherein the output of said modulo *m* adder comprises an estimate of the original data sequence supplied to the channel input.

Figure 1:
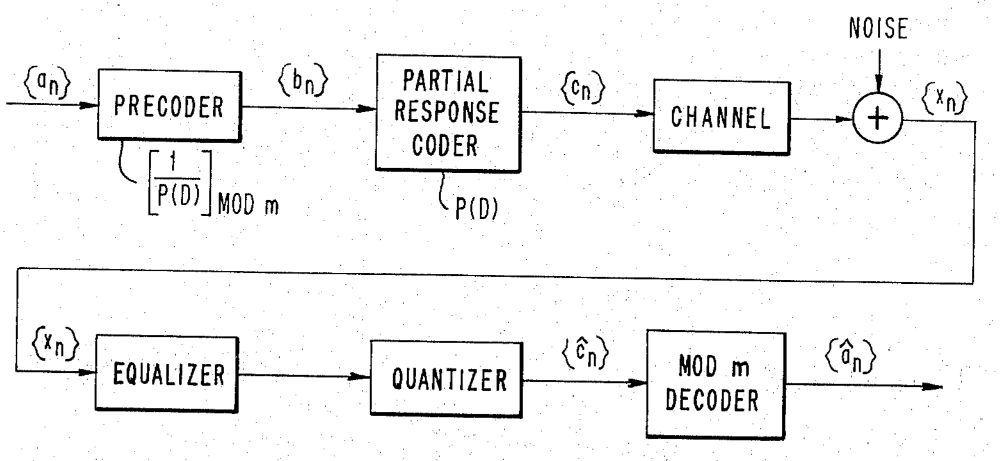
FIG. 1 PRIOR ART
FIG. 1 comprises a functional block diagram of a typical PRIOR ART partial-response transmitting and receiving system with a channel.

As stated previously, the essential significance of the present invention is the embedding of the actual equalizer filter within the inverse filter circuit. This allows better convergence; i.e., a greater assurance of convergence for a given amount of hardware than is possible with the arrangement generally known in the prior art as exemplified by FIG. 1 wherein the equalizer is placed before the filter and detector. It should be noted that the mod m detector shown in FIG. 1 performs the reciprocal of both the precoder and the partial-response coder shown in FIG. 1 to return the received data sequence to the form of generally $\{\hat{a}_n\}$. It should be noted that the symbol ^ denotes an estimate of the originally encoded sequence $\{a_n\}$.

Figure 2:
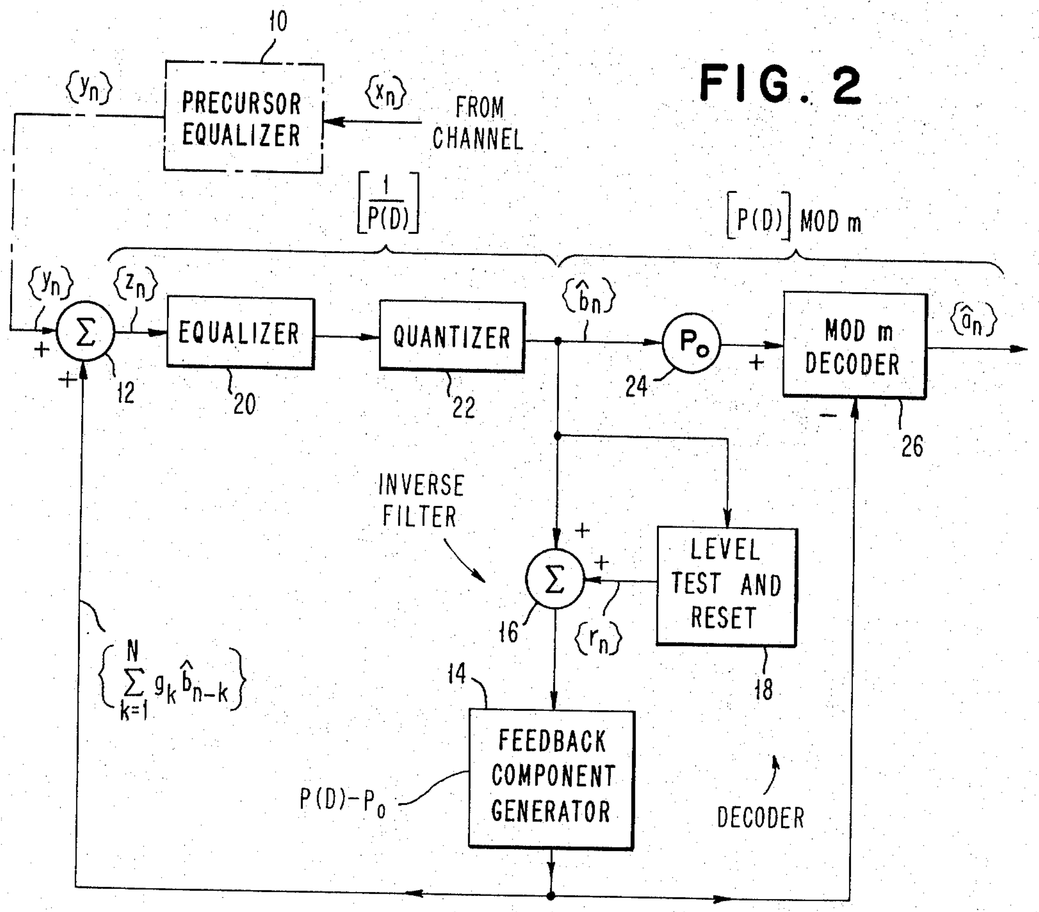
FIG. 2 comprises a functional block diagram of the preferred embodiment of a receiver structure constructed in accordance with the teachings of the present invention.

Referring now to FIG. 2, it will be noted that the same input sequence $\{x_n\}$ is applied to the receiver structure from the channel. The precursor equalizer 10 is shown in dotted lines since as stated previously, there may be negligible precursor intersymbol interference terms in which case little or no precursor equalization would be required. Let us denote the precursor equalizer output by $\{y_n\}$, which is fed directly into the algebraic adder 12. It will be noted that the other input to this adder comes from the feedback component generator 14 which together with the adder 16 and the level test and reset mechanism 18 comprise the inverse filter logic circuitry whereby the output of the adder 12 is now uncorrelated. In the FIG. the sequence $\{z_n\}$ is used to represent the uncorrelated data sequence. The details of this inverse filtering operation will be set forth more fully subsequently. The data sequence $\{z_n\}$ then passes through the equalizer 20 and the quantizer or threshold detector 22. The output of the quantizer 22 being the data sequence $\{\hat{b}_n\}$.

The equalizer 20 which is suitable for use in the present receiver structure may be a fairly straightforward fixed, automatic, or adaptive equalizer since the input is essentially now uncorrelated. Data sequence $\{\hat{b}_n\}$ as is apparent, passes into the inverse filter and decoder circuitry comprising the blocks 16, 18 and 14 and passes into the element 24 which sets a desired value to the term $p_0$. In the present case it is desired that $p_0$ be equal to 1 and accordingly the element 24 disappears. If it were to take some other value such as, for example 2, a multiplier stage would be utilized at the point 24. This output then passes into the mod m decoder 26 which combines the sequence $\{\hat{b}_n\}$ with the output of the feedback component generator 14 in a modulo m addition. This, in essence, performs the inverse of the precoding operation to produce an estimate of the data sequence, $\{\hat{a}_n\}$. It will be noticed that the two brackets over the inverse filter and the decoder specify the transfer function of each of these elements and it will be noted that the inverse filter performs the inverse of the partial-response coder P(D) shown in FIG. 1 and similarly the transfer characteristic of the decoder (that includes the mod m decoder in it) performs the transfer function [P(D)] mod m which is the inverse of the precoding operation clearly shown in FIG. 1. Thus, FIG. 2 illustrates the overall details of the improved receiver system architecture as anticipated by the present invention.

Referring now to FIGS. 3A–3D, a more detailed description of the operation of this preferred embodiment of the invention will be set forth by choosing $P(D) = 1-D^2$ as an illustration.

Figures 3A, 3B:
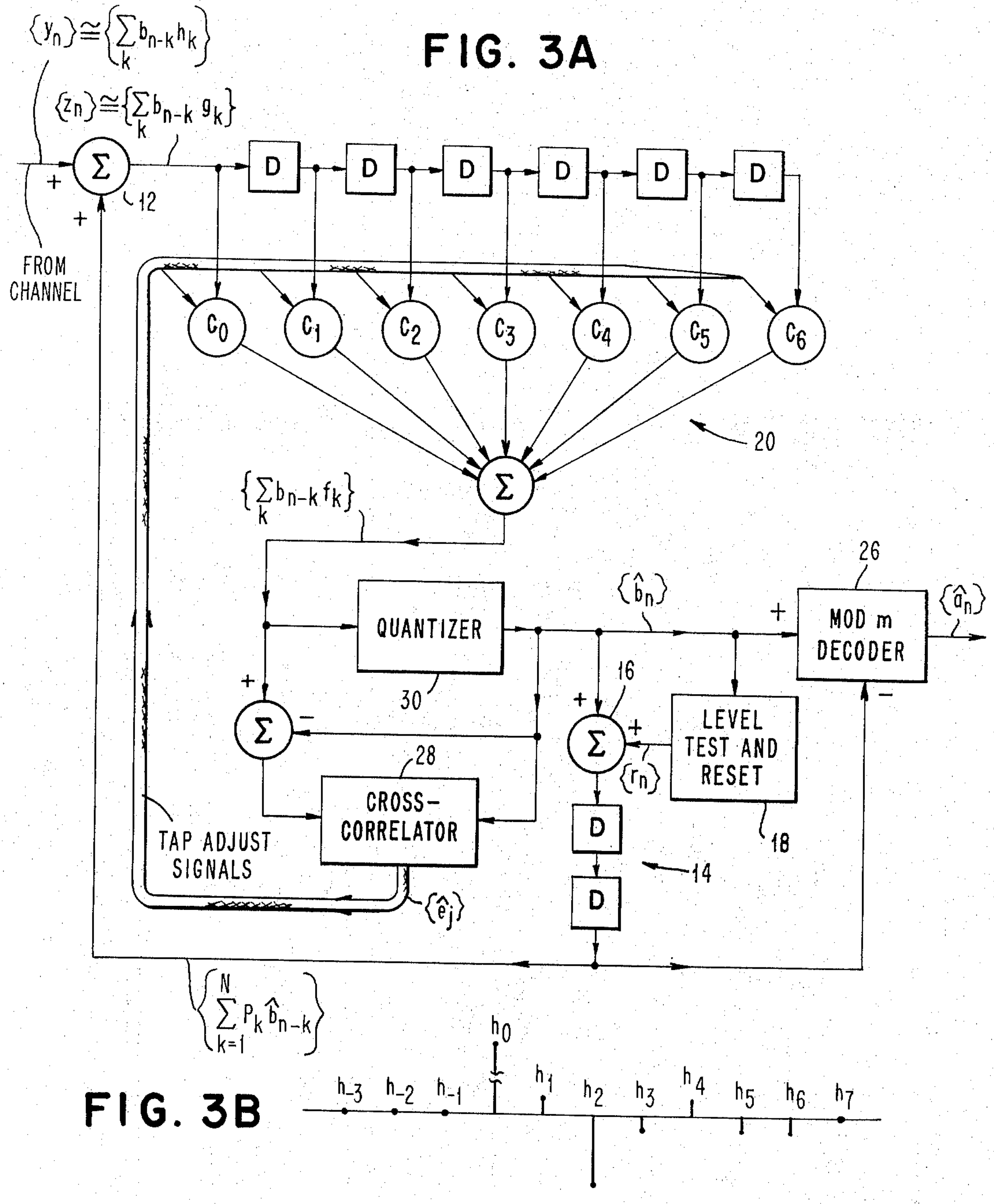
FIG. 3A comprises a more detailed functional block diagram of a preferred embodiment of a receiver structure, excluding a precursor equalizer, constructed in accordance with the present invention. This diagram shows a simple case $P(D) = 1-D^2$ for illustration purposes. Its extension to a general form of P(D) is straightforward.
FIGS. 3B–3D comprise sampled data sequences illustrating the operation of the circuit of FIG. 3A.

It will be remembered from the previous discussion that $\{x_n\}$, the input from the channel, and the precursor equalizer output $\{y_n\}$ are unquantized sequences and that the first adder or summation circuit 12 of FIG. 3A, in essence, takes the inverse filter output $\{\hat{b}_n\}$ and combines it with sequence $\{y_n\}$ to produce the sequence $\{z_n\}$. Given the precursor equalizer output sequence $\{y_n\}$, the second sequence $\{z_n\}$ is, in general, defined by:

$$Z(D) = Y(D) - \{P(D) - p_0\}\,\hat{B}(D) \qquad (6a)$$

where P(D) is the transfer function of the partial-response encoder defined by Equation (1). Equation (*6a*) may be stated equivalently as $$z_n = y_n - \sum_{k=1}^{N} \hat{b}_{n-k} p_k \qquad (6b)$$

The sequence $\{z_n\}$, as can be seen by Equation (*6b*), does not contain controlled intersymbol interference terms due to the partial-response coding P(D). Therefore, were it not for the noise and channel distortion, the sequence $\{z_n\}$ were an m-level sequence with equal level spacing $p_0$. Thus, the sequence $\{z_n\}$ is to be fed into the equalizer 20, where ordinary prior art elevation circuits may be directly used without unnecessary complications, since $\{z_n\}$ no longer contains a large amount of intersymbol interference terms intentionally introduced by the partial-response coding. The following references set forth equalization circuits suitable for use in the present invention. It should be noted that all of these are essentially of the adaptive type.

1. R. W. Lucky et al, Principles of Data Communication, McGraw Hill, 1968.
2. R. W. Lucky, "Automatic Equalization for Digital Communication," BSTJ, Vol. 44, pp. 547–588, Apr. 1965.
3. R. W. Lucky, "Techniques for Adaptive Equalization of Digital Communication," BSTJ, Vol. 45, pp. 255–286, Feb. 1966.
4. A. Gersho, "Adaptive Equalization of Highly Dispersive Channels for Data Transmission," BSTJ Vol. 48, pp. 55–70, Jan. 1969.

The formulas shown on FIG. 3A clearly indicate the signals being fed into the adder 12 to produce the sequence $\{z_n\}$. The illustrated equations, in essence, sum up the signal sets involved in each case. It will be noted that the signal sequence $$\left\{\sum_{k=1}^{N} p_k \hat{b}_{n-k}\right\}$$

is developed by the blocks 14, 16 and 18 which essentially comprise the logic circuitry for the inverse filter and also the logical input for the decoder wich performs the inverse of the precoding function.

From the above general description of FIG. 3, the following general advantages of the present receiver configuration may be seen. The input sequence of the equalizer is now almost uncorrelated, or stated differently, the correlated property of the sequence introduced by the partial-response coding has been removed. This allows the use of more conventional and simpler types of automatic or adaptive equalization circuits. Further, the desired property of precoding is preserved; i.e., the error does not propagate in the final decoded output $\{\hat{a}_n\}$. Therefore, the problem of error propagation is eliminated. Finally the number of thresholds are $m-1$ rather than M−1; wherein $$M = \sum_{k=0}^{N} |p_k| + 1,$$

and in particular $M = 2m-1$ for the system of FIG. 3A where $P(D) = 1-D^2$ is assumed. In the present embodiment this means that the number of thresholds are 1 rather than 2 which simplifies the quantizer structure.

Figure 3C:
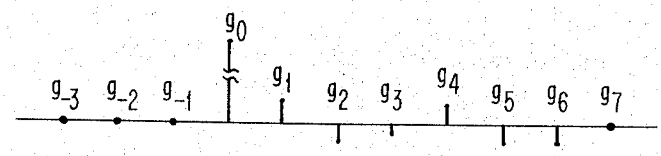
Figure 3D:
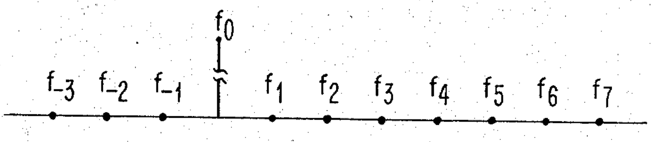

Referring again to the specific embodiment of FIG. 3A and to the sampled signal sequences shown in FIGS. 3B, 3C and 3D, the operation of the present receiver structure will be apparent. Let $\{h_k\}$ be the impulse response sequence of the system including the partial-response coder $P(D) = 1-D^2$, the channel and the precursor equalizer. Therefore we can assume $h_k \approx 0$ for $k < 0$, $h_0 \approx +1$, $h_2 \approx -1$ and the rest of values $h_k$ represent intersymbol interference terms due to the channel distortion. Inside the adder 12 the impulse response sequence becomes $\{g_k\}$ of FIG. 3C which are related to $\{h_k\}$ by $g_k = h_k \; k \neq 2$ and $g_2 = h_2 + z$ Therefore, the remaining job to be done is equalization of $\{g_k\}$, i.e., to suppress non-zero terms of $\{g_k\}$ which are relatively much smaller than the main pulse $g_0$.

The equalization algorithm to be used in this case is not restrictive in the sense it may be automatic or adaptive depending on the need. The control of the tap gains $C_j$is, in general, based on an error tap adjust signal $\hat{e}_j$, which is produced by the cross correlator 28 which forms a portion, as is well known, of any equalization circuitry. However, to restate the equalization principle generally the error signal $\hat{e}_j$ is an estimate of $e_j = f_j - \delta_{j,0}$, where $j$ is equal to or greater than 0. Here, $\{f_k\}$ shown in FIG. 3D is the impulse response observed at the output of the main equalizer as shown in FIG. 3A. The maximum likelihood estimate for $\hat{e}_j$ is obtained by cross correlating the equalizer output minus the threshold detector output with the detector output shifted by $j$ units. The box "level test and reset" 18 is necessary to prepare the system for detecting possible future errors. The generation rule of this unit which determines the reset pulse $r_n$ is as follows:

$$r_n = \begin{cases} -(\hat{b}_n - 1) & \text{if } \hat{b}_n > m-1 \\ -\hat{b}_n & \text{if } \hat{b}_n < 0 \\ 0 & \text{otherwise} \end{cases}$$

Referring now to FIGS. 3B, 3C and 3D the operation of the present receiver element is clearly shown graphically in these three impulse response diagrams wherein it will be noted that each of the numbered points represents a sample of a received pulse at sampling intervals of 1 time unit which as will be noted is represented by D in the above formulas and descriptions. FIG. 3B represents the impulse response observed at the input to the adder 12. As will be further noted in all of these three FIGS., precursor interference is assumed to be essentially either nonexistent in the channel or removed by some sort of precursor equalization.

FIG. 3C shows the impulse response observed at the main equalizer input which is the input sequence $\{h_k\}$ 09 minus the inverse filter output. It will be noted that the essential function of this inverse filtering is to remove the major negative peak at point $h_2$. In FIG. 3D the sequence $\{f_k\}$ is illustrated which is the impulse response observed at the output of the main equalizer which forms the input to the quantizer 30.

FIGS. 3B, 3C and 3D show the operation of the present receiver structure with a single received data pulse with its various intersymbol interference terms wherein both partial-response coding and precoding have been performed on the input sequence.

To be more precise, received sequences $\{y_n\}$, $\{i\ z_n\}$ are related to $\{h_k\}$ and $\{g_k\}$ by $$y_n = \sum_k b_{n-k} h_k + q_n$$

and $$z_n = \sum_k b_{n-k} g_k + q_n$$

where $\{g_n\}$ represents the term due to additive noise of the channel.

It will be further noted that the particular impulses denoted as $h_0$, $g_0$and $f_0$ obviously refer to the main data pulse, i.e., the one which it is desired to detect correctly. In practice, of course, in a received sequence there would be a data bit at each of the sampling points in addition to the various intersymbol interference terms. It is, of course, the object of such equalizing circuits to remove the effects of the intersymbol interference so that essentially only the data pulses will remain, said equalization greatly reducing the probability of detection errors due to said intersymbol interferences.

The above description of the operation of FIG. 3A explains the operation of the most basic and preferred embodiment of the invention where it is assumed that there are essentially no precursor interference terms, such assumption being a reasonable assumption for certain types of channels.

Figure 4A:
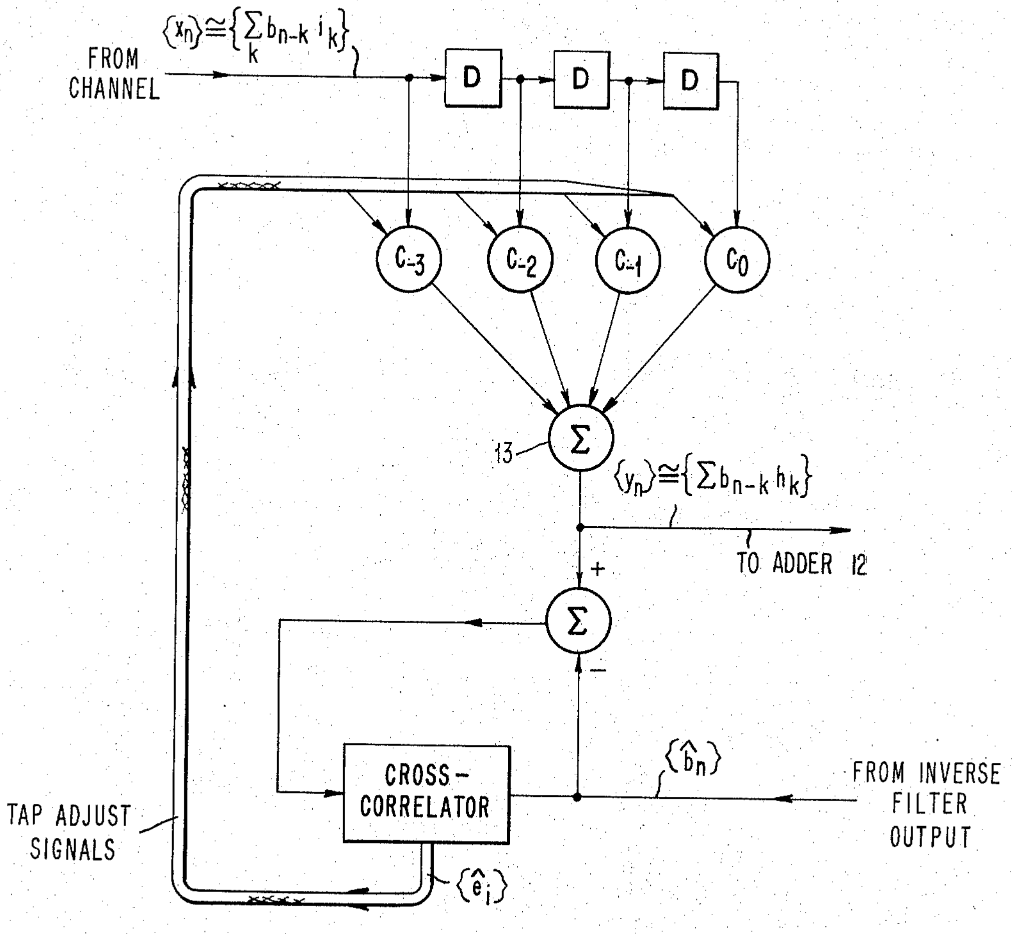
FIG. 4A comprises a detailed functional diagram of a precursor equalizer adopted for use with the receiver of FIG. 3A.

However, in the event that significant precursor intersymbol interference terms are encountered, the embodiment illustrated generally in FIG. 4A could be used wherein this is essentially a conventional equalizer added to the basic system illustrated in FIG. 3A. It will be noted that the input to the main equalizer now comes from the adder 13 which also supplies one input to the adder 12. The other input to the adder 12 comes from the inverse filter output or feedback path. The cross correlator shown in FIG. 4A receives its two inputs from the output of the adder 12 on the one hand and directly from the inverse filter output on the other. The tap adjust signals denoted by $\{\hat{e}_j\}$ is supplied to the tap gain circuits $C_j$.

This precursor equalizer can be implemented using a conventional transversal filter with gain equalizations $\{C_j\}$ defined only for $j \leq 0$. The filter can either be an automatic or adaptive one which is based on the front end parts of the impulse response wherein $\{i_k\}$ where $k \leq 0$. The automatic or adaptive cross correlation and equalizer circuits referenced previously with respect to the equalizer of FIG. 3A also apply here. For consistency of illustration, a specific partial-response function of $G(D) = 1-D^2$ will be used which is representative of interleaved NRZI magnetic recording and also corresponds to the Kretzmer partial-response channel class IV. It should be noted, however, that the present circuitry is similarly extendable to a wide class of partial-response systems including a more conventional NRZI magnetic system $G(D) = 1-D$ and the duo-binary system $G(D) = 1+D$.

Figure 4B:
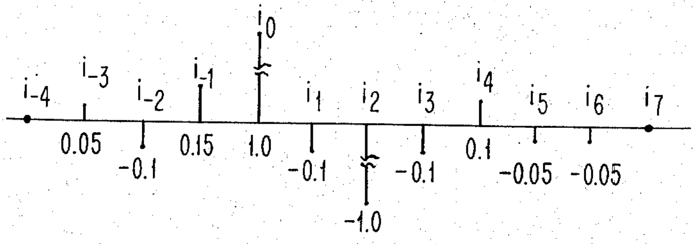
FIGS. 4B and 4C comprise sampled data sequences illustrative of the operation of the precursor equalizer of FIG. 4A.
Figure 4C:
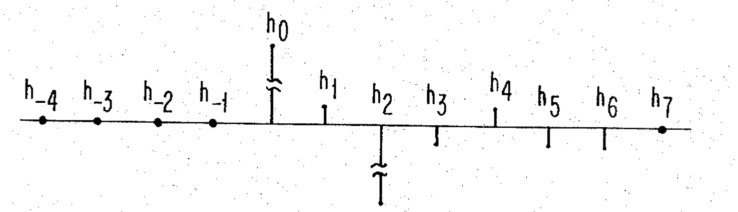

Proceeding now with a description of the operation of the precursor equalizer as shown in FIG. 4A, assume that the impulse response sequence of the system including the partial-response coding is $\{i_k\}$ as depicted in the data sequence of FIG. 4B. In this particular illustrative example it is assumed that $i_k = 0$ for $k < -3$. Hence, the precursor equalizer as shown in FIG. 4A needs only three time unit delays. The data sequence output of the precursor equalizer is denoted by $\{h_k\}$ as shown in FIG. 4C. It should be noted that the time reference for $\{h_k\}$ is shifted by three time units with respect to $\{i_k\}$. This is, of course, due to the three delay units of the tapped filter of FIG. 4A. It is first assumed that the initial tap setting of the equalizer is given by $c_{-3} = c_{-2} = c_{-1} = 0$ and $c_0 = 1$. Then the corresponding sequence $\{h_k\}$ would simply be a shift of $\{i_k\}$ initially. After a sufficient number of iterations in the adaptive mode, the output sequence from the precursor equalizer would be as shown in FIG. 4C. The following is a discussion of the general operation followed by a tabular example of the way in which the precursor equalizer actually functions.

There are a number of algorithms and thus circuits available for automatic or adaptive equalization as set forth in the previous four literature references. The simplest or most straightforwad of these algorithms which is adaptive will be considered. It was originally proposed by R. W. Lucky as set forth in the third (3) previously referenced literature publications for equalization of regular (i.e., not partial-response type) channels. In that particular scheme, the equalizer changes the tap gain $C_j$ to $C_j - \Delta\{\hat{e}_j\}$, where $\Delta$ is some constant and $\hat{e}_j$ is an estimate of $e_j = h_j - \delta_{j,0}$, $\overline{0}$, where in this illustration $j$ ranges from $-3$ to 0, and where $\delta_{j,0}$ is the Kronecker's delta. The estimate $\hat{e}_j$ can be obtained by cross correlating the equalizer output sequence minus the detected sequence $\{\hat{b}_n\}$ with the detected sequence shifted by j; i.e., $\{\hat{b}_{n-j}\}$.

The algorithms and circuits for obtaining the estimate $\{\hat{e}_j\}$ have been well known and are discussed in the above-mentioned third literature reference on pages 255–286.

Table I illustrates the incremental changes of the data sequence $\{h_k\}$ through a series of four iterations where, in this case, $\Delta = 0.05$ was used. Here those terms which are much smaller than $\Delta$ are simply neglected for the sake of clarity. As Table I shows, the intersymbol interference at the preceding terms are eliminated after four iterations in this particular example. It will be noted also that the precursor equalizer output $\{h_k\}$ contains interference terms only for those values of $k \geq 0$. Thus it will be seen that a separate precursor equalizer may be readily combined with the basic receiver structure of the present invention to give the requisite amount of precursor equalization.

In the embodiment of FIG. 4A a basic receiver having a tail equalizer embedded in the inverse filter and as shown in FIG. 3A is combined with the quantizer separate precursor equalizer shown. Thus, for example, the main receiver including the inverse filter and equalizer could be built as a standard unit with a minimum amount of change necessary to add precursor equalization.

In the Table the initial data sequence is:

$i_{-4}, i_{-3}, i_{-2}, i_{-1}, i_0, \ldots, i_4$;

and the initial tap settings are $C_{-3} = C_{-2} = C_{-1} = 0$; $C_0 = 1$. In this example the tap gains are adjusted according to the iterative formula $C_i \rightarrow C_i - \Delta \text{ sgn } \hat{e}_i = C_i + \delta C_i$, $i \leq 0$.

TABLE I

| Sampling points | $h_{-4}$ | $h_{-3}$ | $h_{-2}$ | $h_{-1}$ | $h_0$ | $h_1$ | $h_2$ | $h_3$ | $h_4$ |
|---|---|---|---|---|---|---|---|---|---|
| | 0 | 0.05 | −0.1 | 0.15 | 1 | −0.1 | −1 | −0.1 | 0.1 |
| 1st iteration: | | | | | | | | | |
| $\delta c_{-3} = -\Delta = -0.05$ | 0 | −0.05 | 0 | 0.05 | 0 | | | | |
| $\delta c_{-2} = \Delta = 0.05$ | | 0 | 0.05 | 0 | −0.05 | 0 | | | |
| $\delta c_{-1} = -\Delta = -0.05$ | | | 0 | −0.05 | 0 | 0.05 | 0 | | |
| $\{h_k\}$ | 0 | 0 | −0.05 | 0.15 | 0.95 | −0.05 | −1 | −0.1 | 0.1 |

TABLE I—Continued

| Sampling points | $h_{-4}$ | $h_{-3}$ | $h_{-2}$ | $h_{-1}$ | $h_0$ | $h_1$ | $h_2$ | $h_3$ | $h_4$ |
|---|---|---|---|---|---|---|---|---|---|
| 2d iteration: | | | | | | | | | |
| $\delta c_{-3}=0$ | | | | | | | | | |
| $\delta c_{-2}=+0.05$ | | 0 | +0.05 | 0 | −0.05 | 0 | | | |
| $\delta c_{-1}=-0.05$ | | | 0 | −0.05 | 0 | +0.05 | 0 | | |
| $\delta c_0=+0.05$ | | | | 0 | +0.05 | 0 | −0.05 | 0 | |
| $\{h_k\}$ | 0 | 0 | 0 | 0.10 | 0.95 | 0 | −1.05 | −0.1 | 0.1 |
| 3d iteration: | | | | | | | | | |
| $\delta c_{-1}=-0.05$ | | | 0 | −0.05 | 0 | +0.05 | 0 | | |
| $\delta c_0=+0.05$ | | | | 0 | +0.05 | 0 | −0.05 | 0 | |
| $\{h_k\}$ | 0 | 0 | 0 | 0.05 | 1.0 | 0.05 | −1.1 | −0.1 | 0.1 |
| 4th iteration: | | | | | | | | | |
| $\delta c_{-1}=-0.05$ | | | 0 | −0.05 | 0 | +0.05 | 0 | | |
| $\{h_k\}$ | 0 | 0 | 0 | 0 | 1.0 | 0.1 | −1.1 | −0.1 | 0.1 |

Figure 5A:
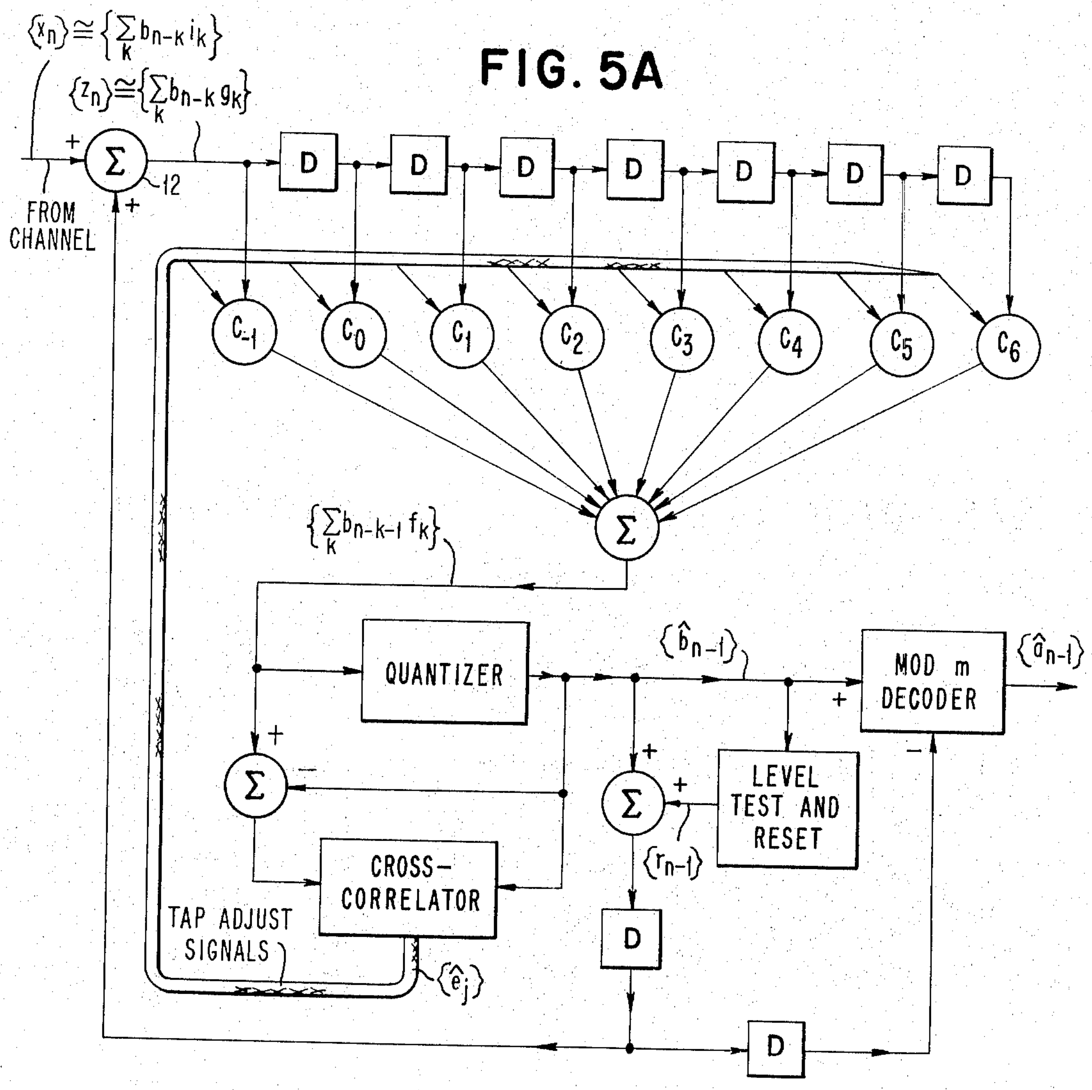
FIG. 5A comprises a further embodiment of the present invention wherein a limited amount of precursor equalization is built directly into the inverse filter and quantizer circuit.

In the event that it is desired to build a single equalizer, it is also possible to utilize the receiver circuit shown in FIG. 5A wherein a means is shown for equalizing one precursor term; i.e., $h_{k-1}$ prior to the fundamental signal $h_0$. In certain instances where the intereference terms of the precursor are not severe, the circuitry of FIG. 5A may be utilized. This situation would be especially likely when quadrature amplitude modulation (QAM) rather than single sideband (SSB) is utilized.

Figure 5B:
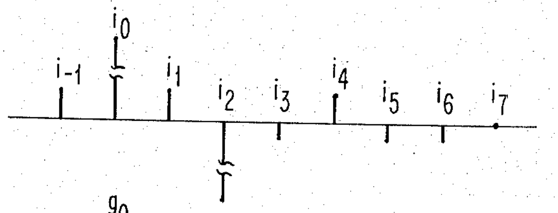
FIGS. 5B–5D comprise sampled data sequences representing the operation of the receiver of FIG. 5A.

Proceeding now with a brief description of FIG. 5A, assume that the input response of the channel is such that$i_k = 0$ for $k < -1$ as shown in FIG. 5B. In this event the equalizer of FIG. 3A is essentially modified to the form shown in FIG. 5A by moving one of the two delay elements originally included in the feedback circuit to the front end of the equalizer and modifying the equalizer. The decoder circuit which derives $\{\hat{a}_n\}$ from $\{\hat{b}_n\}$ must accordingly be modified by adding a delay circuit in the path to the mod m decoder.

Figure 5C:
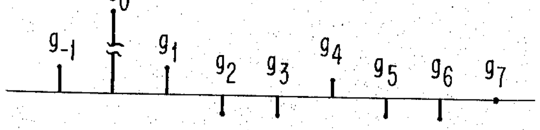
Figure 5D:
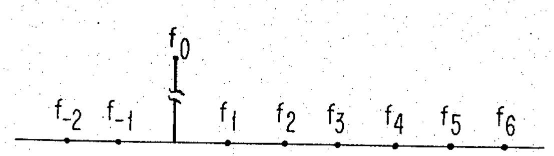

Returning to the FIGS., the impulse response sequence to the receiver is denoted in FIG. 5B by the sequence $\{i_k\}$. This is also shown in FIG. 5A. It will be noted, of course, that there is an interference terma at $k = -1$ and again the fundamental signal appears at $i_0$. The output of the inverse filter adder 12 is shown in FIG. 5C wherein term $g_2$ is essentially removed by the inverse filtering operation. It will be noted that the extra stage of delay in the equalizer filter in order to equalize the precursor term $i_{-1}$ causes the output of the equalizer and quantizer $\{b_n\}$ to be delayed by one unit to become $\{b_{n-1}\}$. This is shown in FIG. 5D wherein the predominant signal emanating from the equalizer, $f_0$, is shifted one bit word to the right denoting one bit of delay. Similarly, the output of the mod m decoder $\{\hat{a}_{n-1}\}$ is delayed one unit with respect to the original signal sequence $\{x_n\}$.

While it is possible to directly build precursor equalization into the equalizer filter of the basic receiver circuit of FIG. 3A as exemplified in FIG. 5A the circuitry to do this becomes somewhat cumbersome and is also obviously limited to the particular precursor intersybol interference terms for which the circuit was designed. Accordingly, the basic embodiment fof FIG. 3A providing for a typical sequence of tail intersymbol interference terms can be utilized generally and whenever precursor equalization is required, a separate precursor equalizer may be incorporated readily with the circuit as indicated in FIG. 4A.

CONCLUSIONS

It has been shown in the above description of the embodiments of the invention set forth and described that the basic receiver configuration of FIG. 3A may be readily modified in a number of different ways to provide for precursor as well as tail intersymbol interference terms. As stated previously, the particular equalizer algorithms and circuitry utilized are not critical to the essential features of the present invention; it being noted of course, that the particular equalizer algorithms whether fixed automatic or adaptive, would determine the reliability of the equalization or convergence and also the cost of the circuitry. Thus in summation, the present receiver configuration involves the novel embedding of an equalizer and a quantizer in the inverse filter circuit. This configuration allows subtraction of the major intersymbol interference terms from the partial-response decoding system output. As a result, the input to the equalizer is an uncorrelated sequence without major intersymobl interference terms; and, therefore, existing equalization techniques can be employed without further complication. If the front end or precursor interference terms are significant, these terms can be eliminated by adding a separate precursor equalizer. When the front end intersymbol interference is moderate the methods exemplified by FIG. 5A are able to reduce such intersymbol interference terms without using a separate precursor equalizer.

Finally, the proposed structure does not impose any limitation on the possible use of different types of equalizer structures or equalization algorithms. For instance, these equalizers can be fixed automatic or adaptive. In the case of the fixed equalizers, they can be designed in the frequency domain as well.

While the invention has been particularly shown and described with reference to preferred embodiments therof, it will be understood that by those skilled in the art that the foregoing and other changes in form and detils may be made therein without departing from the spirit and scope of the invention.

What is claimed is:

1. A receiver structure for use with a partial-response channel adapted to be connected to a source of partial-response coded data from said channel; said receiver comprising:

inverse filter and decoder means for performing the inverse of partial-response coding and pre-coding operations respectively to reproduce an original binary data sequence;

a first algebraic adder for combining the partial-response coded data sequence from said channel with a feedback signal from the inverse filter which produces an uncorrelated data sequence;

a multi-tap equalizer filter embedded within the inverse filter and connected to the output of said first adder including means for controlling the tap weights thereof;

means connecting the output of said equalizer filter to the input of logic circuit means for the inverse filter and decoder; and means connecting the output of said inverse filter logic circuit means to said decoder wherein the output of said decoder is an uncorrelated binary data sequence representative of the original uncorrelated input to the channel.

2. A receiver structure as set forth in claim 1 including a separate precursor equalizer inserted between the channel output and the input to said receiver, said precursor equalizer comprising;

an $m$-bit delay line having $m + 1$ adjustable gain taps wherein $m$ equals the number of precursor terms to be equalized, the output of said precursor equalizer comprising the sum of the outputs of said taps which sum is connected to the inverse filter and input of its embedded equalizer.

3. A receiver structure as set forth in claim 1 including means within said inverse filter and equalizer circuits for equalizing m precursor intersymbol interference terms in an input data sequence including:

means for supplying equalizer filter feedback signals to appropriate taps of said filter to equalize said m precursor terms in said equalizer filter; and delay circuit means in said inverse filter and decoder logic circuit means to maintain the proper delay relationship with respect to the inverse filtering and decoding operations.

4. A receiver structure for decoding and equalizing partial-response coded data received from a channel, said receiver comprising:

an inverse filter for performing the inverse of the partial-response transfer function;

a decoder for performing the inverse of the precoding transfer function;

logic circuitry for producing the inverse filter and second detector control signals;

a multi-tap equalizer filter;

correlator means for controlling the tap settings of said equalizer filter;

means for supplying uncorrelated data to the input of said equalizer filter;

the output of said equalizer filter being connected to the input of a quantizer, the output of said quantizer being connected to the inverse filter and decoder logic circuitry;

the output of said quantizer also being connected to said decoder which comprises a modulo-m added wherein $m$ is the number of levels in the precoded data and wherein the output of said modulo-m adder comprises an estimate of the original data sequence supplied to the data system.

5. A receiver structure as set forth in claim 4 wherein said means for supplying comprises:

a first adder, including means for receiving a partial-response precoded data sequence from the channel as one input and the inverse filter feedback signal as the other input;

means connecting the output of said filter adder to said equalizer filter.

6. A receiver structure as set forth in claim 5 wherein said equalizer filter comprises:

$n$ delay units having $n + 1$ taps, adjustable gain means connected to each of said taps;

cross-correlation means connected to each side of said quantizer to provide control of said variable gain means for achieving said equalization function.

7. A method for equalizing a correlated data sequence received from a channel which comprises:

generating a feedback signal and combining same with the incoming data sequence to perform the inverse of the correlation function applied to said data sequence;

passing said uncorrelated data sequence through equalizer filter means to equalize distortions in said data sequence;

decoding the output of the equalizer filter to approximately produce the data sequence prior to preencoding.

8. A method for equalizing a correlated data sequence as set forth in claim 7 including the step of equalizing precursor interference terms prior to uncorrelating the data sequence.

9. A method for equalizing a correlated data sequence as set forth in claim 7 including equalizing $m$ precursor interference terms in uncorrelated form and delaying the ouptut in $\tau$ units of time where $\tau$ represents a data period and adjusting the delay in the uncorrelating step to allow for the additional delay in the equalizing step.

10. A method for equalizing a correlated data sequence as set forth in claim 9 including quantizing the data sequence after equalizing same and cross-correlating the quantizer input with the output to develop a control signal for adjusting the equalizing process as the equalized signal deviates from a derived norm.

* * * * *

PO-1050
(5/69)

UNITED STATES PATENT OFFICE
CERTIFICATE OF CORRECTION

Patent No. 3,792,356 Dated February 12, 1974

Inventor(s) H. Kobayashi and D. T. Tang

It is certified that error appears in the above-identified patent and that said Letters Patent are hereby corrected as shown below:

Column 13, line 18, after the, insert --input of the--

Column 13, line 19, delete "input of"

Signed and sealed this 2nd day of July 1974.

(SEAL)
Attest:

EDWARD M. FLETCHER,JR.
Attesting Officer

C.MARSHALL DANN
Commissioner of Patents